US011228631B2

(12) United States Patent
Poornachary et al.

(10) Patent No.: US 11,228,631 B2
(45) Date of Patent: Jan. 18, 2022

(54) APPARATUS, SYSTEM, AND METHOD FOR CONDITIONALLY PERFORMING MEDIA DELIVERY INDEX MEASUREMENTS ON STREAMING MEDIA

(71) Applicant: Juniper Networks, Inc., Sunnyvale, CA (US)

(72) Inventors: Manikandan Musuvathi Poornachary, Bangalore (IN); Ayushi Jain, Jaipur (IN); Aayush Gupta, Delhi (IN)

(73) Assignee: Juniper Networks, Inc, Sunnyvale, CA (US)

( * ) Notice: Subject to any disclaimer, the term of this patent is extended or adjusted under 35 U.S.C. 154(b) by 452 days.

(21) Appl. No.: 16/395,678

(22) Filed: Apr. 26, 2019

(65) Prior Publication Data

US 2020/0344285 A1 Oct. 29, 2020

(51) Int. Cl.
*G06F 15/16* (2006.01)
*H04L 29/06* (2006.01)
*H04L 12/26* (2006.01)

(52) U.S. Cl.
CPC .......... *H04L 65/80* (2013.01); *H04L 43/0894* (2013.01); *H04L 43/16* (2013.01); *H04L 65/601* (2013.01)

(58) Field of Classification Search
CPC ... H04L 43/087; H04L 43/0894; H04L 43/16; H04L 65/601; H04L 65/80
See application file for complete search history.

(56) References Cited

U.S. PATENT DOCUMENTS

| | | | | |
|---|---|---|---|---|
| 2006/0184670 | A1* | 8/2006 | Beeson | H04L 65/60 709/224 |
| 2010/0235438 | A1* | 9/2010 | Narayanan | H04L 65/602 709/203 |
| 2012/0314761 | A1* | 12/2012 | Melnyk | H04L 65/607 375/240.02 |
| 2013/0054958 | A1* | 2/2013 | Braness | H04N 21/25841 713/150 |

(Continued)

OTHER PUBLICATIONS

Welch et al., "A Proposed Media Delivery Index (MDI)", URL: https://tools.ietf.org/html/rfc4445, Network Working Group, Apr. 2006, pp. 1-10.

(Continued)

*Primary Examiner* — Normin Abedin
(74) *Attorney, Agent, or Firm* — FisherBroyles, LLP

(57) ABSTRACT

A disclosed method may include (1) identifying, within a network, a media stream under consideration for a conditional MDI, (2) identifying, for the media stream, an expected packet rate at which the media stream is expected to pass through at least a portion of the network, (3) determining, for the media stream, an actual packet rate at which the media stream actually passes through the portion of the network, (4) calculating, based at least in part on the expected packet rate and the actual packet rate, a media rate variation that represents a reference for determining whether to perform the conditional MDI on the media stream, (5) determining that the media rate variation meets a certain threshold, and then upon determining that the media rate variation meets the certain threshold, (6) performing the conditional MDI on the media stream. Various other systems and methods are also disclosed.

20 Claims, 7 Drawing Sheets

(56) References Cited

U.S. PATENT DOCUMENTS

2015/0341812 A1* 11/2015 Dion ................ H04N 21/2404
370/252
2018/0048567 A1* 2/2018 Ignatchenko ....... H04L 45/3065

OTHER PUBLICATIONS

Wikipedia, "Media Delivery Index", URL: https://en.wikipedia.org/wiki/Media_Delivery_Index, as accessed on Apr. 28, 2019, 4 pages.

* cited by examiner

APPARATUS, SYSTEM, AND METHOD FOR CONDITIONALLY PERFORMING MEDIA DELIVERY INDEX MEASUREMENTS ON STREAMING MEDIA

BACKGROUND

The Media Delivery Index (MDI) is a network feature that facilitates monitoring the quality of streaming media destined for computing devices. The MDI may include and/or represent certain components that each necessitate Deep Packet Inspection (DPI). Unfortunately, such DPI may consume network resources and/or introduce latency into the streaming media, potentially impairing the performance of the network and/or the quality of the streams. The instant disclosure, therefore, identifies and addresses a need for additional and improved apparatuses, systems, and methods for conditionally performing MDI measurements on streaming media.

SUMMARY

As will be described in greater detail below, the instant disclosure generally relates to apparatuses, systems, and methods for conditionally performing MDI measurements on streaming media. In one example, a method for accomplishing such a task may include (1) identifying, within a network, a media stream under consideration for a conditional MDI, (2) identifying, for the media stream, an expected packet rate at which the media stream is expected to pass through at least a portion of the network, (3) determining, for the media stream, an actual packet rate at which the media stream actually passes through the portion of the network, (4) calculating, based at least in part on the expected packet rate and the actual packet rate, a media rate variation that represents a reference for determining whether to perform the conditional MDI on the media stream, (5) determining that the media rate variation meets a certain threshold, and then upon determining that the media rate variation meets the certain threshold, (6) performing the conditional MDI on the media stream.

In some examples, the method may also include identifying an expected media rate that accounts for an amount of data that is expected to pass through the portion of the network during a certain interval. In such examples, the method may further include identifying the number of packets that are carried by a network layer of the network during the certain interval. In addition, the method may include identifying the size of the packets carried by the network layer of the network. Finally, the method may include calculating the expected packet rate for the media stream by multiplying the number of packets by the size of the packets and dividing the expected media rate by a product of the number of packets and the size of the packets.

In some examples, the method may also include calculating the media rate variation by subtracting the actual packet rate from the expected packet rate, dividing a difference of the actual packet rate and the expected packet rate by the expected packet rate, and then multiplying a quotient of the difference and the expected packet rate by one hundred.

In some examples, the method may also include incrementing a counter in response to the determination that the media rate variation meets the certain threshold. In such examples, this counter may track the number of continuous intervals during which the certain threshold has been met. In one example, the method may further include determining that the counter meets an additional threshold. In response to this determination, the method may include activating the conditional MDI for the media stream. In addition, the method may include resetting this counter for a further determination on whether to activate the conditional MDI on the media stream.

In another example, the method may further include determining that this counter does not meet an additional threshold. In response to this determination, the method may include resetting this counter for a further determination on whether to activate the conditional MDI on the media stream.

In some examples, the method may also include determining that the media rate variation no longer meets the certain threshold. In response to this determination, the method may include incrementing a counter that tracks the number of continuous intervals during which the certain threshold has not been met. In one example, the method may further include determining that this counter meets an additional threshold. In response to this determination, the method may include deactivating the conditional MDI for the media stream. In addition, the method may include resetting this counter for a further determination on whether to deactivate the conditional MDI on the media stream.

In some examples, the method may also include performing DPI on the media stream as part of the conditional MDI. Additionally or alternatively, the method may include evaluating the quality of the media stream as part of the conditional MDI. The method may further include performing at least one corrective action on the media stream based at least in part on the quality of the media stream. In one embodiment, the conditional MDI for the media stream may include a delay factor component that involves deep packet inspection and/or a media loss rate component that involves deep packet inspection.

In some examples, the method may also include (1) identifying, within the network, an additional media stream under consideration for an additional conditional MDI, (2) identifying, for the additional media stream, an expected packet rate at which the additional media stream is expected to pass through at least a portion of the network, (3) determining, for the additional media stream, an actual packet rate at which the additional media stream actually passes through the portion of the network, (4) calculating, based at least in part on the expected packet rate and the actual packet rate, an additional media rate variation that represents a reference for determining whether to perform the additional conditional MDI on the media stream, (5) determining that the additional media rate variation does not meet an additional threshold, (6) incrementing a counter that tracks the number of continuous intervals during which the additional threshold has not been met in response to that determination, (7) determining that the counter does not meet a further threshold, and then (8) resetting the counter for a future determination on whether to deactivate the conditional MDI on the media stream.

Similarly, a system that implements the above-identified method may include a processing device configured to execute various modules stored in memory. In one example, this system may include and/or execute (1) an identification module that (A) identifies, within a network, a media stream under consideration for a conditional MDI and (B) identifies, for the media stream, an expected packet rate at which the media stream is expected to pass through at least a portion of the network, (2) a determination module that determines, for the media stream, an actual packet rate at which the media stream actually passes through the portion of the network, (3) a calculation module that calculates, based at least in part on the expected packet rate and the actual packet rate, a media rate variation that represents a reference for determining whether to perform the conditional MDI on the media stream, (4) wherein the determination module further determines that the media rate variation meets a certain threshold, and (5) a media-delivery-index module that performs the conditional MDI on the media stream.

Additionally or alternatively, an apparatus that implements the above-identified method may include a storage device that stores a conditional MDI for evaluating the quality of select media streams within a network. In one example, the apparatus may also include a processing device that is communicatively coupled to the storage device. In this example, the processing device may (1) identify, within a network, a media stream under consideration for a conditional MDI, (2) identify, for the media stream, an expected packet rate at which the media stream is expected to pass through at least a portion of the network, (3) determine, for the media stream, an actual packet rate at which the media stream actually passes through the portion of the network, (4) calculate, based at least in part on the expected packet rate and the actual packet rate, a media rate variation that represents a reference for determining whether to perform the conditional MDI on the media stream, (5) determine that the media rate variation meets a certain threshold, and then upon determining that the media rate variation meets the certain threshold, (6) perform the conditional MDI on the media stream.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
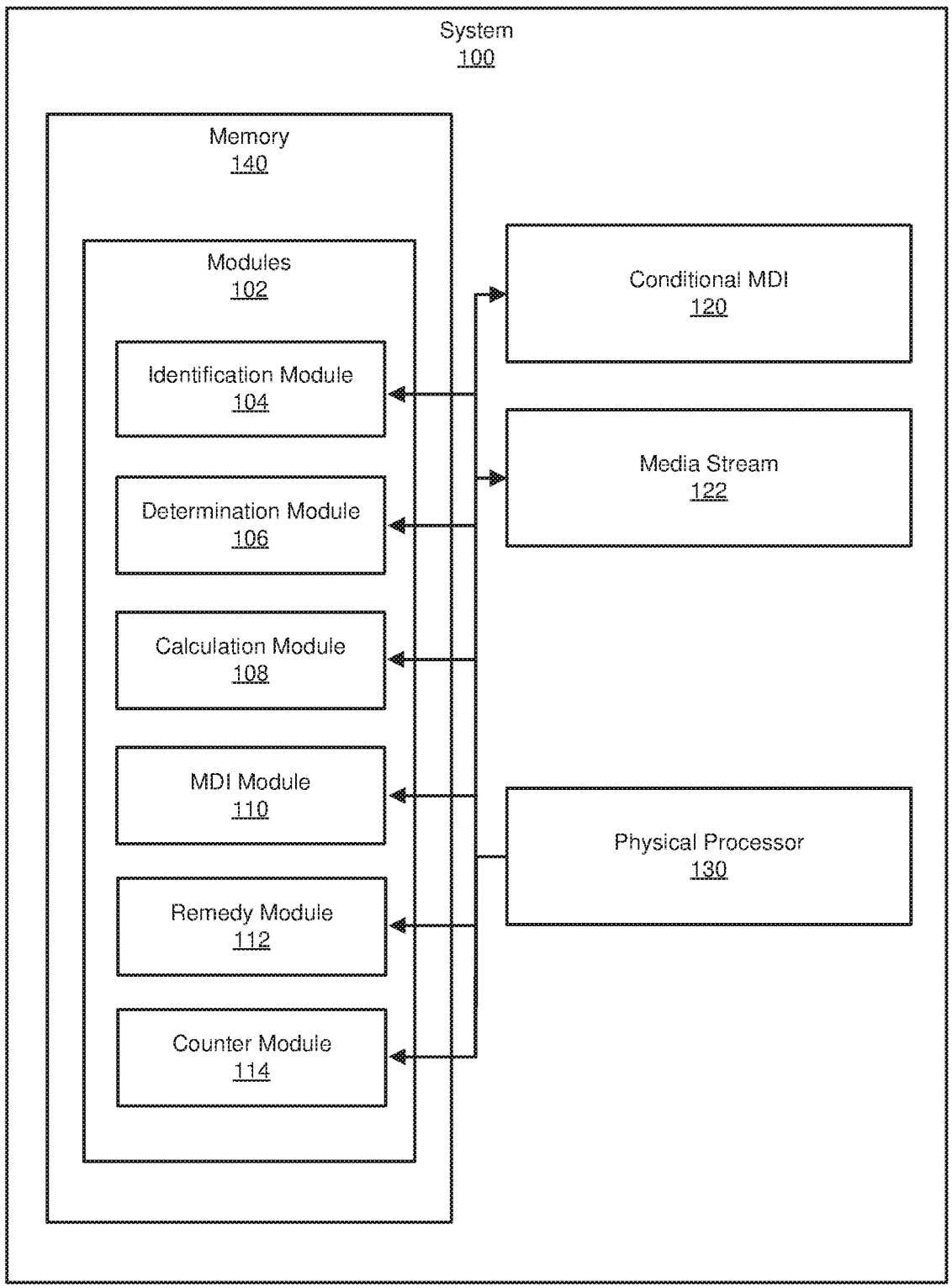
FIG. 1 is a block diagram of an exemplary system for conditionally performing MDI measurements on streaming media.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for conditionally performing MDI measurements on streaming media. As will be explained in greater detail below, by performing MDI measurements only on those media streams that meet certain criteria, embodiments of the instant disclosure may reduce the amount of DPI applied by network devices to streaming media. As a result, embodiments of the instant disclosure may conserve network resources (such as processing power and/or memory) and/or avoid introducing the resource-consumption penalty of DPI on certain media streams, thereby potentially improving the performance of those network devices and/or the overall network. Additionally or alternatively, embodiments of the instant disclosure may increase the delivery speed of streaming media and/or avoid introducing the latency penalty of DPI on certain media streams, thereby potentially improving the quality of those media streams.

In some examples, embodiments of the instant disclosure may facilitate quantifying the top-level of quality of media streams without performing DPI. Moreover, embodiments of the instant disclosure may facilitate activating and/or deactivating DPI for MDI on a per-stream basis, as opposed to a system-level basis.

Figure 2:
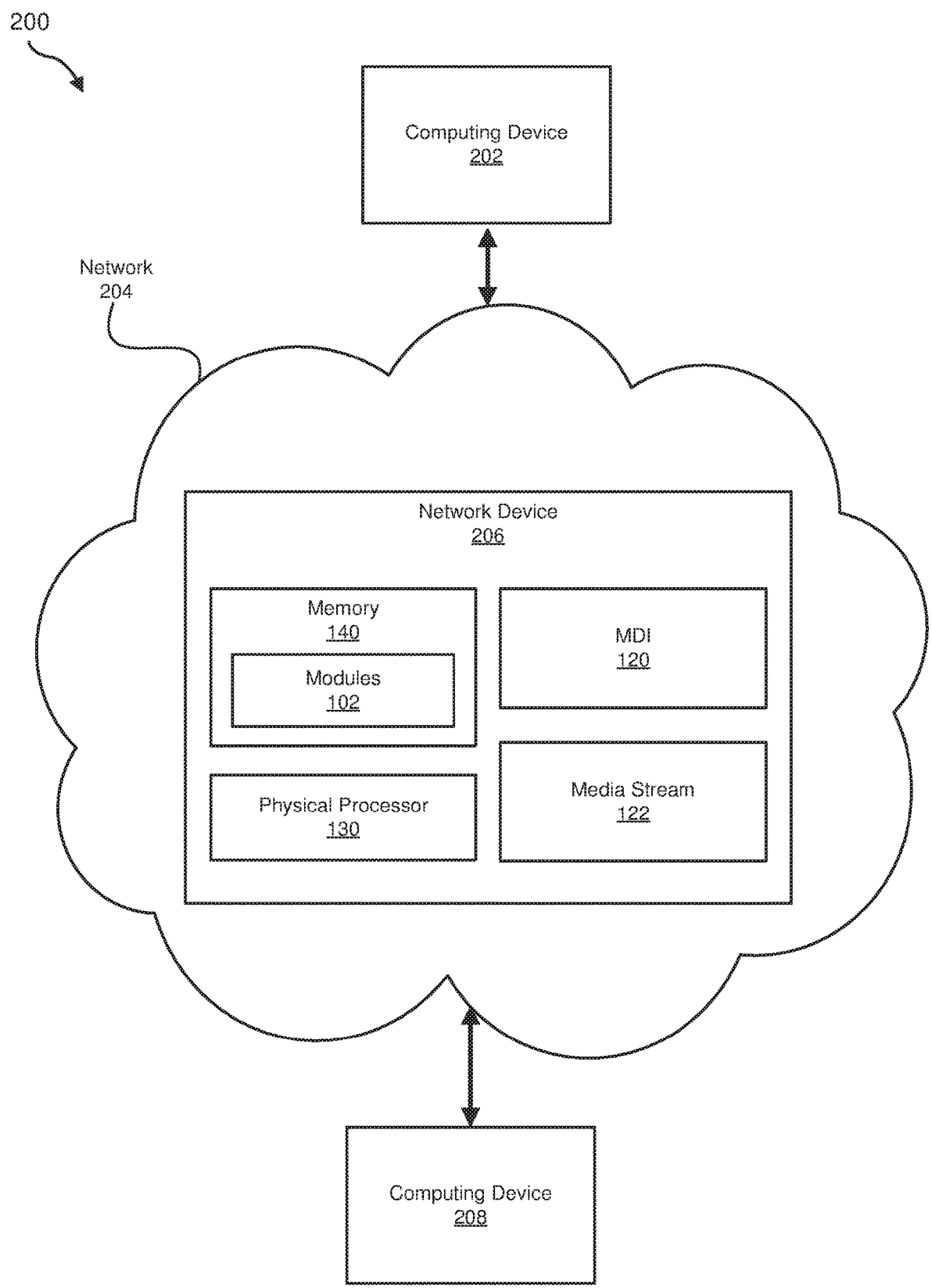
FIG. 2 is a block diagram of an exemplary system for conditionally performing MDI measurements on streaming media.
Figure 3:
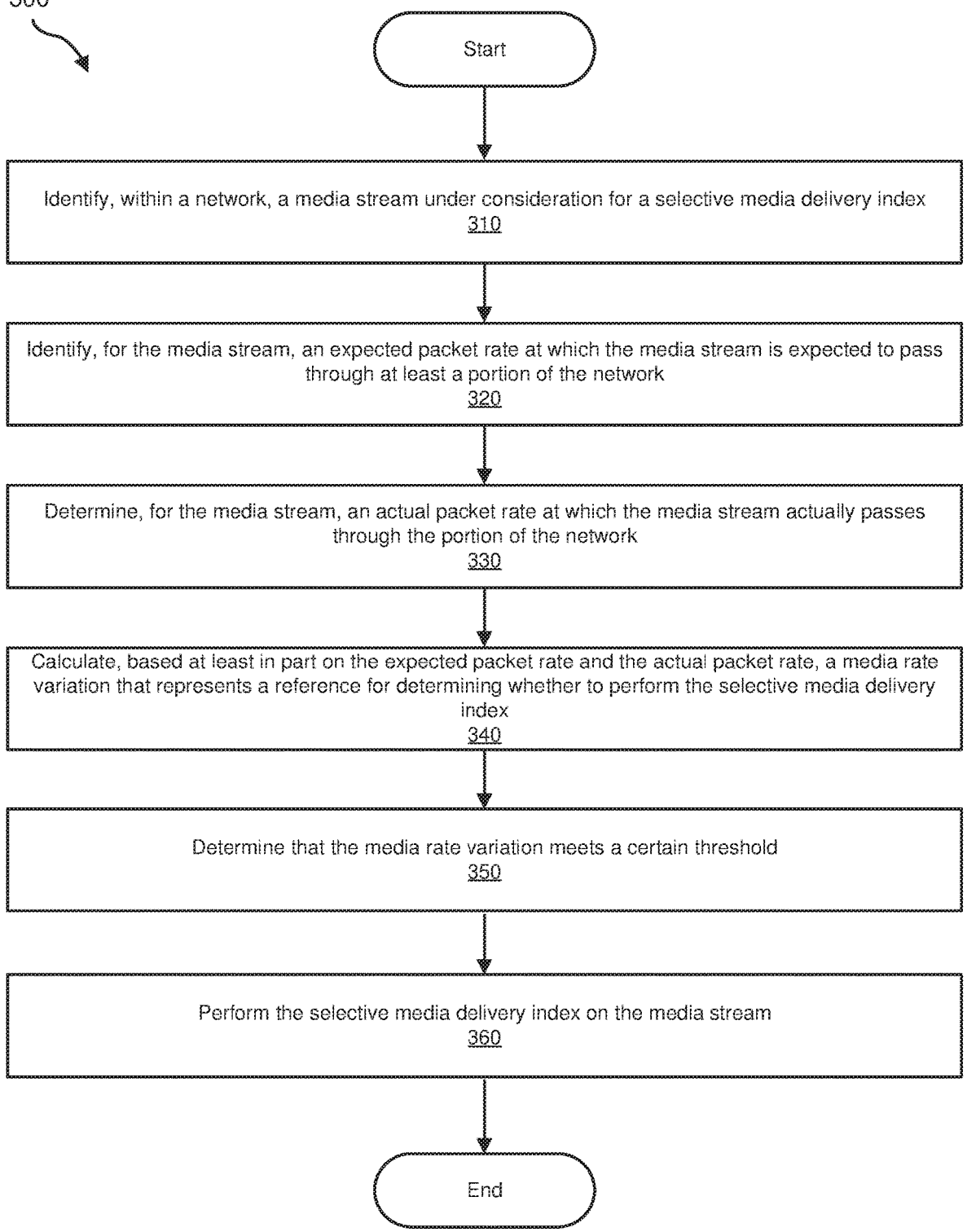
FIG. 3 is a flow diagram of an exemplary method for conditionally performing MDI measurements on streaming media.
Figure 4:
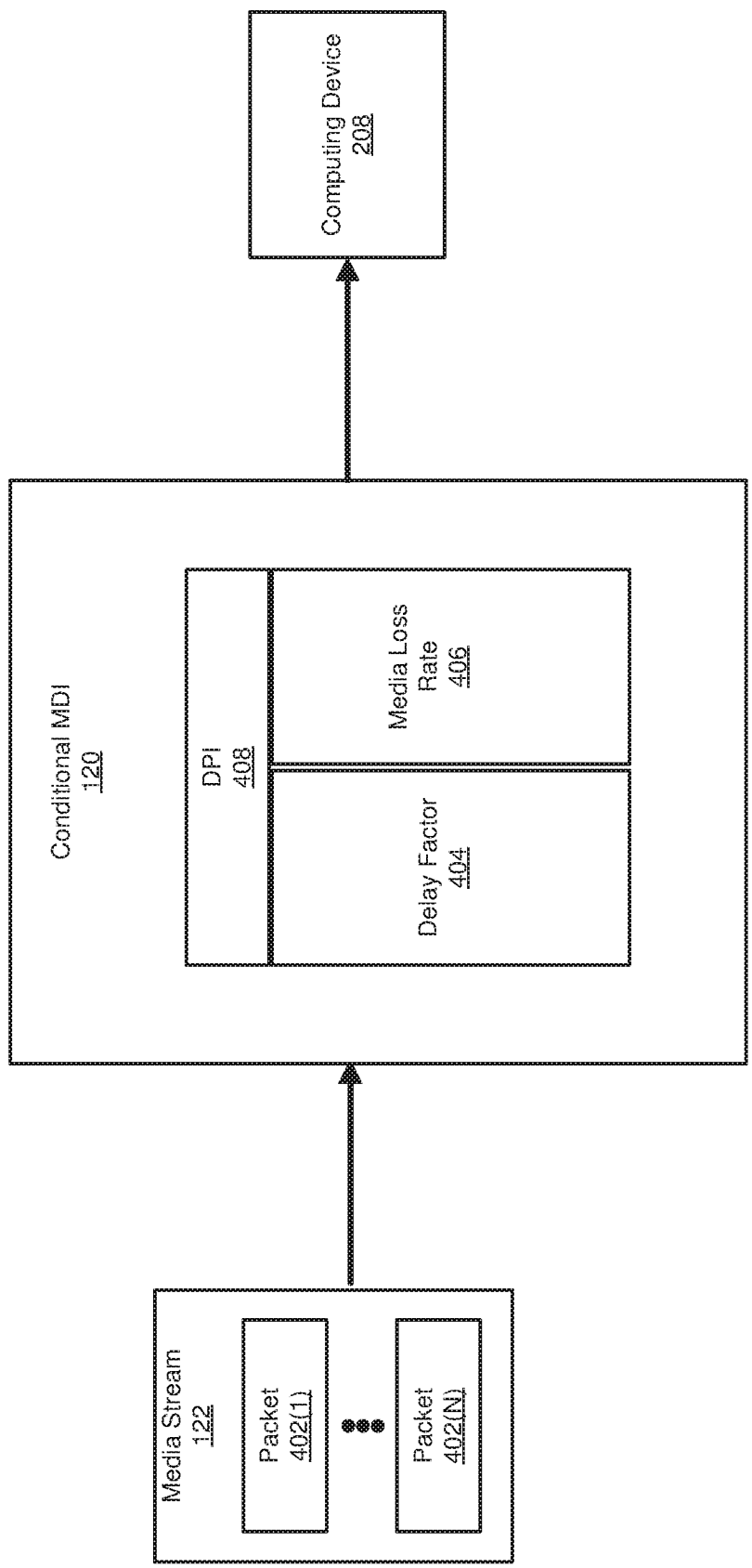
FIG. 4 is a block diagram of an exemplary system for conditionally performing MDI measurements on streaming media.

The following will provide, with reference to FIGS. 1, 2, and 4, detailed descriptions of exemplary apparatuses, systems, and corresponding implementations for conditionally performing MDI measurements on streaming media. Detailed descriptions of corresponding computer-implemented methods and flow diagrams will be provided in connection with FIGS. 3 and 6. Detailed descriptions of exemplary statistics of a media stream will be provided in connection with FIG. 5. In addition, detailed descriptions of an exemplary computing system for carrying out these methods will be provided in connection with FIG. 7.

FIG. 1 shows an exemplary system 100 that facilitates conditionally performing MDI measurements on streaming media. As illustrated in FIG. 1, system 100 may include one or more modules 102 for performing one or more tasks. As will be explained in greater detail below, modules 102 may include an identification module 104, a determination module 106, a calculation module 108, an MDI module 110, a remedy module 112, and/or a counter module 114. Although illustrated as separate elements, one or more of modules 102 in FIG. 1 may represent portions of a single module or application (such as an operating system, a processing application, and/or a network application) running on a processing device, a routing engine, a field-replaceable unit, a packet forwarding engine, and/or any other suitable component of a network device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 208, and/or network device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to conditionally performing MDI measurements on streaming media. Examples of physical processor 130 include, without limitation, CPUs, microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include and/or involve one or more MDIs, such as an MDI 120. In some examples, MDI 120 may include and/or represent software, firmware, and/or hardware that measures, monitors, and/or evaluates streaming media. In one example, MDI 120 may include and/or represent a delay factor component and/or a media loss rate component. In this example, the delay factor component and/or the media loss component may convey and/or reflect the quality of the streaming media.

As illustrated in FIG. 1, exemplary system 100 may additionally include and/or involve one or more media streams, such as a media stream 122. In some examples, media stream 122 may include and/or represent a set of packets that transfer media data from one computing device to another. In one example, media stream 122 may include and/or represent any type or form of video data transmitted from a source to a destination for display to a user. Additionally or alternatively, media stream 122 may include and/or represent any type or form of audio data transmitted from a source to a destination for presentation to a user.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication between a computing device 202 and/or a computing device 208. In one example, network 204 may include and/or incorporate a network device 206. Network device 206 may also include and/or incorporate memory 140 and physical processor 130. In this example, physical processor 130 may execute one or more of modules 102 stored in memory 140 for the purpose of conditionally performing MDI measurements on streaming media. In addition, network device 206 may include MDI 120 and/or forward media stream 122 from computing device 202 to computing device 208.

For example, and as will be described in greater detail below, one or more of modules 102 may cause network device 206 to (1) identify, within network 204, media stream 122 under consideration for conditional MDI 120, (2) identify, for media stream 122, an expected packet rate at which media stream 122 is expected to pass through at least a portion of network 204, (3) determine, for media stream 122, an actual packet rate at which media stream 122 actually passes through the portion of network 204, (4) calculate, based at least in part on the expected packet rate and the actual packet rate, a media rate variation that represents a reference for determining whether to perform the conditional MDI 120 on media stream 122, (5) determine that the media rate variation meets a certain threshold, and then upon determining that the media rate variation meets the certain threshold, and (6) perform the conditional MDI 120 on media stream 122.

Network device 206 generally represent any type or form of physical computing device capable of reading computer-executable instructions and/or handling network traffic. In one example, network device 206 may include and/or represent a router (such as a provider edge router, hub router, spoke router, autonomous system boundary router, and/or area border router) that receives, routes, forwards, and/or otherwise handles network traffic. Additional examples of network device 206 include, without limitation, switches, hubs, modems, bridges, repeaters, gateways, multiplexers, network adapters, network interfaces, laptops, tablets, desktops, servers, cellular phones, Personal Digital Assistants (PDAs), multimedia players, embedded systems, wearable devices, gaming consoles, variations or combinations of one or more of the same, and/or any other suitable network devices. An apparatus for conditionally performing MDI measurements on streaming media may include and/or represent all or a portion of network device 206.

Network 204 generally represents any medium or architecture capable of facilitating communication or data transfer. In one example, network 204 may facilitate communication between network device 206 and computing device 202 and/or computing device 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, computing devices 202 and 208 may alternatively represent a portion of network 204 and/or be included in network 204.

Computing devices 202 and 208 each generally represents any type or form of computing device capable of reading computer-executable instructions. In one example, computing devices 202 and 208 may include and/or represent client devices involved and/or engaged in a communication session with one another. In another example, computing devices 202 and 208 may include and/or represent a network device (such as a router and/or switch) that handles and/or forwards traffic within a network and/or across networks. Additional examples of computing devices 202 and 208 include, without limitation, endpoint devices, laptops, tablets, desktops, servers, cellular phones, Personal Digital Assistants (PDAs), multimedia players, embedded systems, client devices, wearable devices (e.g., smart watches, smart glasses, etc.), gaming consoles, variations or combinations of one or more of the same, and/or any other suitable computing device.

FIG. 3 is a flow diagram of an exemplary computer-implemented method 300 for conditionally performing MDI measurements on streaming media. The steps shown in FIG. 3 may be performed by any suitable computer-executable code and/or computing system, including system 100 in FIG. 1, system 200 in FIG. 2, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify, within a network, a media stream under consideration for a conditional MDI. For example, identification module 104 may, as part of network device 206 in FIG. 2, identify media stream 122 within network 204. In one example, media stream 122 may originate at computing device 202 and/or be destined for computing device 208. In this example, media stream 122 may be under consideration for conditional MDI. As will be described in greater detail below, depending on certain characteristics of media stream 122, network device 206 may apply MDI on media stream 122 or opt to forgo MDI on media stream 122.

The systems described herein may perform step 310 in a variety of ways and/or contexts. In some examples, identification module 104 may receive media stream 122 from computing device 202. In one example, media stream 122 may arrive at network device 206 on the way to computing device 208. As media stream reaches network device 206, identification module 104 may identify media stream 122.

In some examples, identification module 104 may identify a type or form of media (such as video and/or audio) contained in and/or represented by media stream 122. For example, identification module 104 may inspect and/or search a streaming request in connection with media stream 122 for certain characteristics and/or attributes of media stream 122. Additionally or alternatively, identification module 104 may inspect and/or search one or more packets of media stream 122 for certain characteristics and/or attributes of media stream 122. In this example, identification module 104 may inspect and/or search the payloads and/or headers of such packets.

Examples of such characteristics and/or attributes of media stream 122 include, without limitation, media types, video data, audio data, media resolutions, expected packet rates, packet sizes, expected media rates, relevant network layers, data and/or file formatting, relevant encoding, file extensions, filenames, headers, metadata, payloads, relevant applications, source devices, destination devices, combinations or variations of one or more of the same, and/or any other suitable characteristics and/or attributes.

As illustrated in FIG. 3, at step 320 one or more of the systems described herein may identify, for the media stream, an expected packet rate at which the media stream is expected to pass through at least a portion of the network. For example, identification module 104 may, as part of network device 206 in FIG. 2, identify an expected packet rate for media stream 122. In this example, the expected packet rate may include and/or represent the speed at which media stream 122 is expected to provide and/or deliver packets from computing device 202 to computing device 208 via network device 206.

The systems described herein may perform step 320 in a variety of ways and/or contexts. In some examples, identification module 104 may identify the expected packet rate based at least in part on certain characteristics and/or attributes of media stream 122. For example, identification module 104 may identify the expected packet rate by inspecting and/or searching metadata of media stream 122. Additionally or alternatively, identification module 104 may receive the expected packet rate from determination module 106 and/or calculation module 108.

As an example, determination module 106 and/or calculation module 108 may determine and/or calculate the expected packet rate based at least in part on certain characteristics and/or attributes of media stream 122. For example, determination module 106 and/or calculation module 108 may determine and/or calculate the expected packet rate by applying the following formula:

$$\text{Expected Packet Rate} = \frac{\text{Expected Media Rate}}{\text{Media Packet Count} * \text{Media Packet Size}}.$$

In this example, the expected media rate may correspond to and/or represent the rate (in, e.g., bits per second) at which media stream 122 is expected to traverse and/or pass through network device 206 during an MDI interval. In other words, the expected media rate may account for the amount of data expected to pass through network device 206 during the MDI interval. The media packet count may correspond to and/or represent the number of media packets carried via the network layer and/or Layer 3 during the MDI interval. In addition, the media packet size may correspond to and/or represent the size of each of those media packets (in, e.g., bits).

In some embodiments, the expected media rate may correspond to, coincide with, and/or track with the type of media involved in media stream 122 and/or the desired resolution of media stream 122. As a specific example, media stream 122 may include and/or represent a 1080p high-definition video. In this example, to achieve and/or maintain the desired quality for such a video, media stream 122 may have an expected media rate of 5000 kilobits per second.

As another example, media stream 122 may include and/or represent a 720p high-definition video. In this example, to achieve and/or maintain the desired quality for such a video, media stream 122 may have an expected media rate of 2500 kilobits per second. As a further example, media stream 122 may include and/or represent a high-definition audio presentation. In this example, to achieve and/or maintain the desired quality for such an audio presentation, media stream 122 may have an expected media rate of 64 kilobits per second.

As illustrated in FIG. 3, at step 330 one or more of the systems described herein may determine, for the media stream, an actual packet rate at which the media stream actually passes through the portion of the network. For example, determination module 106 may, as part of network device 206 in FIG. 2, determine an actual packet rate of media stream 122. In this example, the actual packet rate may include and/or represent the speed at which media stream 122 actually provides and/or delivers packets from computing device 202 to computing device 208 via network device 206.

The systems described herein may perform step 330 in a variety of ways and/or contexts. In some examples, determination module 106 may measure the actual packet rate of media stream 122 at network device 206. In such examples, determination module 106 may determine the actual packet rate of media stream 122 based at least in part on this measurement.

Additionally or alternatively, determination module 106 may receive statistics of media stream 122 from another computing device. For example, determination module 106 may receive statistics of media stream 122 from computing device 202, computing device 208, and/or a separate network device (not necessarily illustrated in FIG. 2) within network 204. From these statistics, determination module 106 may determine the actual packet rate of media stream 122.

As illustrated in FIG. 3, at step 340 one or more of the systems described herein may calculate, based at least in part on the expected packet rate and the actual packet rate, a media rate variation that represents a reference for determining whether to perform the conditional MDI on the media stream. For example, calculation module 108 may, as part of network device 206 in FIG. 2, calculate a media rate variation of media stream 122 based at least in part on the expected packet rate and the actual packet rate. In this example, the media rate variation may serve as an efficient indicator and/or metric of the quality and/or health of media stream 122.

The systems described herein may perform step 340 in a variety of ways and/or contexts. In some examples, calculation module 108 may calculate the media rate variation by subtracting the expected packet rate from the actual packet rate. In one example, the media rate variation may be expressed as a percentage of the expected packet rate for the MDI interval. For example, calculation module 108 may calculate the media rate variation by applying the following formula:

$$\text{Media Rate Variation} = \frac{\text{Expected Packet Rate} - \text{Actual Packet Rate}}{\text{Expected Packet Rate}} * 100.$$

In some examples, the media rate variation may not necessitate DPI. Accordingly, calculation module 108 may be able to calculate the media rate variation as an inline function without necessarily introducing any latency into media stream 122. In one example, the systems and methods disclosed herein may rely on the media rate variation as a preliminary inquiry into the quality of media stream 122 without invoking DPI. On the one hand, if the media rate variation indicates that the quality of media stream 122 appears to be suffering and/or below a certain standard, these systems and methods may opt to activate conditional MDI 120 for closer inspection and/or additional detail. On the other hand, if the media rate variation indicates that the quality of media stream 122 does not appear to be suffering and/or below such a standard, these systems and methods may opt to maintain conditional MDI 120 inactive so as to avoid introducing the latency that derives from the corresponding DPI.

As illustrated in FIG. 3, at step 350 one or more of the systems described herein may determine that the media rate variation meets a certain threshold. For example, determination module 106 may, as part of network device 206 in FIG. 2, determine that the media rate variation of media stream 122 meets a certain threshold. In one example, the threshold may correspond to and/or represent an unacceptable amount of deviation between the expected packet rate and the actual packet rate.

In other words, if the media rate variation of media stream 122 meets and/or is above this threshold, media stream 122 may be exhibiting an unacceptable amount of deviation between the expected packet rate and the actual packet rate, thus indicating that the quality of media stream 122 appears to be unsatisfactory. However, if the media rate variation of media stream 122 does not meet and/or is below this threshold, media stream 122 may be exhibiting an acceptable amount of deviation between the expected packet rate and the actual packet rate, thus indicating that the quality of media stream 122 appears to be satisfactory.

The systems described herein may perform step 350 in a variety of ways and/or contexts. In some examples, determination module 106 may compare the media rate variation against the threshold. In one example, determination module 106 may determine that the media rate variation is above the threshold. In this example, because the media rate variation is above the threshold, media stream 122 may be exhibiting an unacceptable amount of deviation between the expected packet rate and the actual packet rate. This unacceptable amount of deviation may indicate that media stream 122 is potentially suffering and/or in need of further inspection and/or monitoring via MDI. Accordingly, by being above the threshold, the media rate variation may indicate that media stream 122 has met the condition(s) for MDI 120.

In one example, determination module 106 may determine that the media rate variation is below the threshold. In this example, because the media rate variation is below the threshold, media stream 122 may be exhibiting only an acceptable amount of deviation (if any at all) between the expected packet rate and the actual packet rate. Such little deviation may indicate that media stream 122 is exhibiting acceptable quality for a user and/or does not appear to necessitate further inspection and/or monitoring via MDI. Accordingly, by being below the threshold, the media rate variation may indicate that media stream 122 has not met the condition(s) for MDI 120.

As illustrated in FIG. 3, at step 360 one or more of the systems described herein may perform the conditional MDI on the media stream. For example, MDI module 110 may, as part of network device 206 in FIG. 2, perform conditional MDI 120 on media stream 122 due at least in part to the media rate variation having met the threshold. In this example, MDI 120 may include and/or involve a delay factor component and/or a media loss rate component.

The systems described herein may perform step 360 in a variety of ways and/or contexts. In some examples, MDI module 110 may perform conditional MDI 120 on media stream 122 by measuring and/or reporting the delay factor and media loss rate of media stream 122. As illustrated in FIG. 4, media stream 122 may include and/or represent packets 402(1)-(N). In one example, packets 402(1)-(N) may traverse to network device 206 on their way to computing device 208. In this example, at network device 206, MDI module 110 may apply DPI 408 to one or more of packets 402(1)-(N) to facilitate measuring and/or reporting a delay factor 404 and/or a media loss rate 406 as part of conditional MDI 120.

In some embodiments, delay factor 404 may include and/or represent a time value that indicates how many milliseconds' worth of data a virtual buffer must be able to contain in order to eliminate time distortions and/or jitter in media stream 122. Additionally or alternatively, media loss rate 406 may indicate and/or represent the number of packets from media stream 122 that were lost over a certain time interval (e.g., a one-second interval). In one example, MDI 120 may identify, locate, and/or address any packet loss based at least in part on media loss rate 406. In another example, MDI 120 may identify and/or measure jitter margins using delay factor 404. MDI 120 may also establish an infrastructure monitor for both media loss rate 406 and/or delay factor 404 to analyze any other possible scenarios of interest.

In some examples, one or more of the systems described herein may remedy certain problems and/or complications identified via MDI 120 within network 204. For example, remedy module 112 may, as part of network device 206, reconfigure and/or redefine certain system specifications to address jitter and/or packet loss in connection with media stream 122. Additionally or alternatively, remedy module 112 may modify one or more network components to improve the quality of media stream 122.

In some examples, MDI module 110 may avoid performing MDI 120 on media stream 122 due at least in part to the media rate variation not having met the threshold. For example, MDI module 110 may refrain from measuring and/or reporting delay factor 404 and/or media loss rate 406 in connection with media stream 122. Likewise, MDI module 110 may refrain from applying DPI 408 to any of packets 402(1)-(N) as media stream 122 is transferred to computing device 208.

Figure 5:
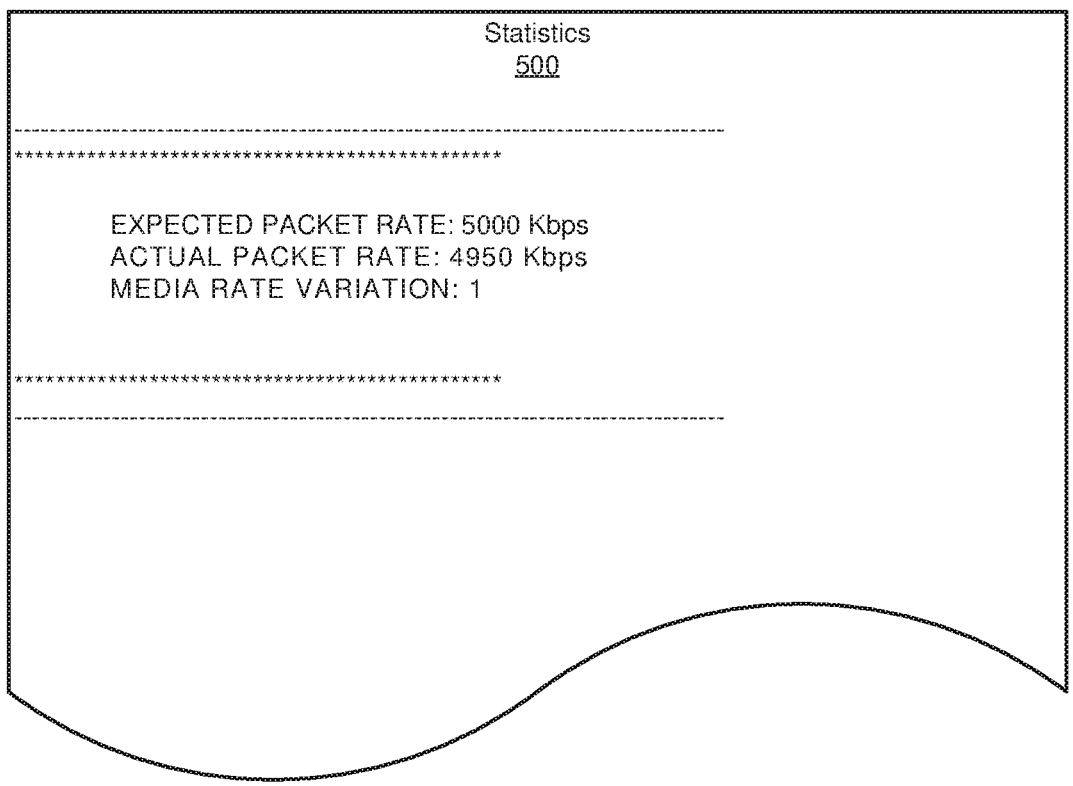
FIG. 5 is an illustration of exemplary statistics detected and/or calculated in connection with a conditional MDI.

In some examples, the various systems and methods described herein may form and/or represent a self-monitoring MDI domain based on media rate variation measurements. As a specific example, one or more of modules 102 may identify, determine, and/or calculate statistics 500 in FIG. 5 in any of the ways described above in connection with method 300. As illustrated in FIG. 5, statistics 500 may include and/or represent an expected packet rate of 5000 Kbps, an actual packet rate of 4950 Kbps, and/or a media rate variation of 1.

Figure 6:
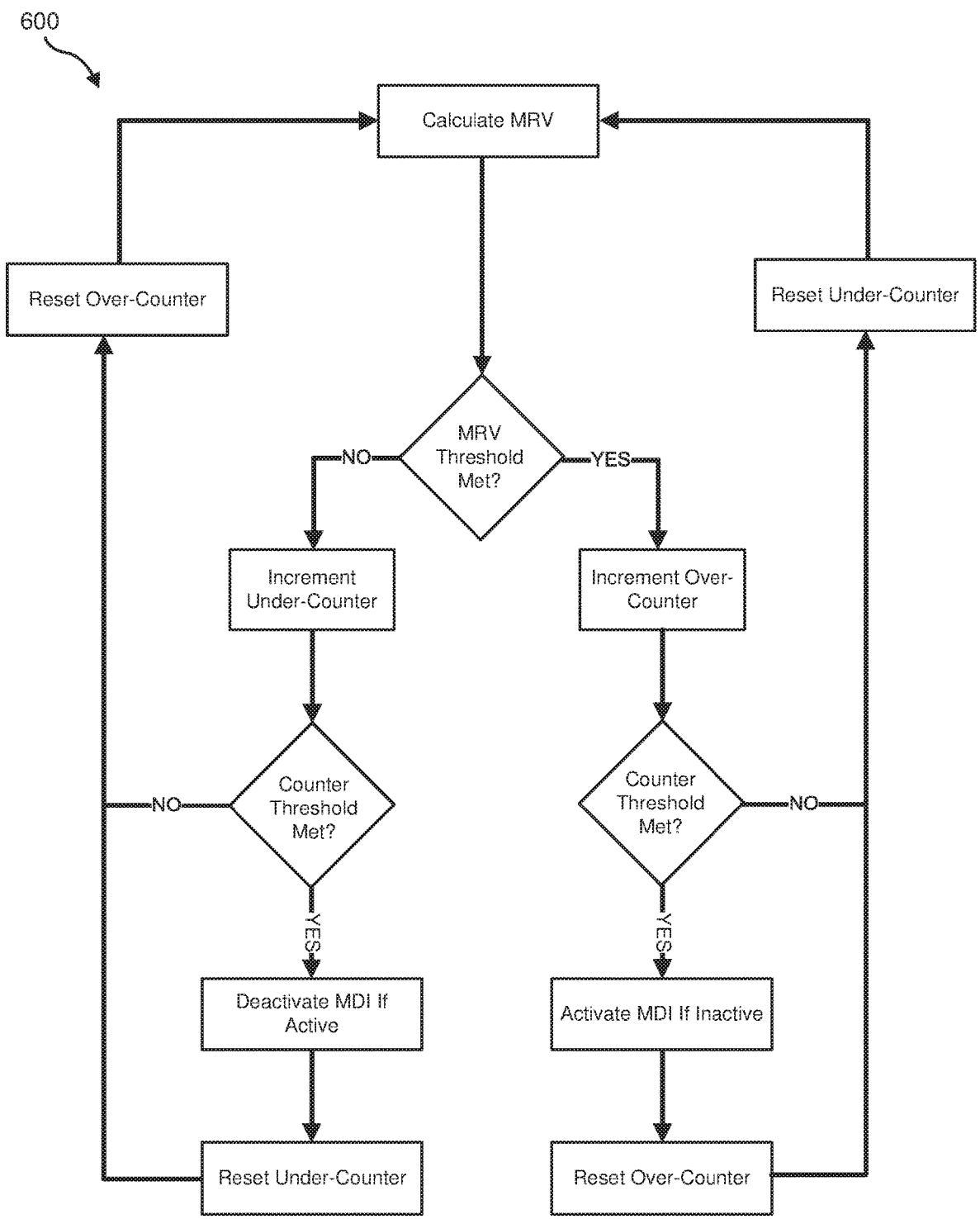
FIG. 6 is a flow diagram of an exemplary self-monitoring MDI domain based on media rate variation measurements.

In some examples, the various systems and methods described herein may follow flow diagram 600 in FIG. 6 to make self-monitoring MDI decisions. For example, calculation module 108 may calculate the Media Rate Variation (MRV) of 1 in statistics 500 for a specific interval of media stream 122 based at least in part on the expected packet rate of 5000 Kbps and the actual packet rate of 4950 Kbps. From there, determination module 106 may determine whether the MRV of 1 meets the MRV threshold. If the MRV of 1 does not meet the MRV threshold, an under-counter may be incremented. In one example, this under-counter may keep track of the number of continuous intervals in which the MRV is under the MRV threshold. For example, counter module 114 may, as part of network device 206, increment the under-counter to reflect that, for that interval, the MRV is under the MRV threshold.

However, if the MRV of 1 does meet the MRV threshold, an over-counter may be incremented. In one example, this over-counter may keep track of the number of continuous intervals in which the MRV is over the MRV threshold. For example, counter module 114 may increment the over-counter to reflect that, for that interval, the MRV is over the MRV threshold.

Following flow diagram 600 in FIG. 6 down the execution path of incrementing the under-counter, determination module 106 may determine whether the under-counter meets an under-counter threshold. If the under-counter does not meet that under-counter threshold, counter module 114 may reset the over-counter and then return the execution path to calculate another MRV to repeat the process shown in flow diagram 600. However, if the under-counter does meet that under-counter threshold, counter module 114 may deactivate MDI 120 for the media stream under consideration if MDI 120 is currently active. Upon deactivating MDI 120, counter module 114 may reset the under-counter and the over-counter and then return the execution path to calculate another MRV to repeat the process shown in flow diagram 600.

Following flow diagram 600 in FIG. 6 down the execution path of incrementing the over-counter, determination module 106 may determine whether the over-counter meets an over-counter threshold. If the over-counter does not meet that over-counter threshold, counter module 114 may reset the under-counter and then return the execution path to calculate another MRV to repeat the process shown in flow diagram 600. However, if the over-counter does meet that over-counter threshold, counter module 114 may activate MDI 120 for the media stream under consideration if MDI 120 is currently inactive. Upon activating MDI 120, counter module 114 may reset the over-counter and the under-counter and then return the execution path to calculate another MRV to repeat the process shown in flow diagram 600.

The various systems and methods may perform self-monitoring conditional MDI on various media streams. For example, one or more of modules 102 may perform the processes described above and shown in flow diagram 600 in FIG. 6 in connection with media stream 122. Additionally or alternatively, one or more of modules 102 may perform the processes described above and shown in flow diagram 600 in FIG. 6 in connection with another media stream. In one example, one or more of modules 102 may perform certain portions of such processes in connection with media stream 122 and that other stream simultaneously.

Figure 7:
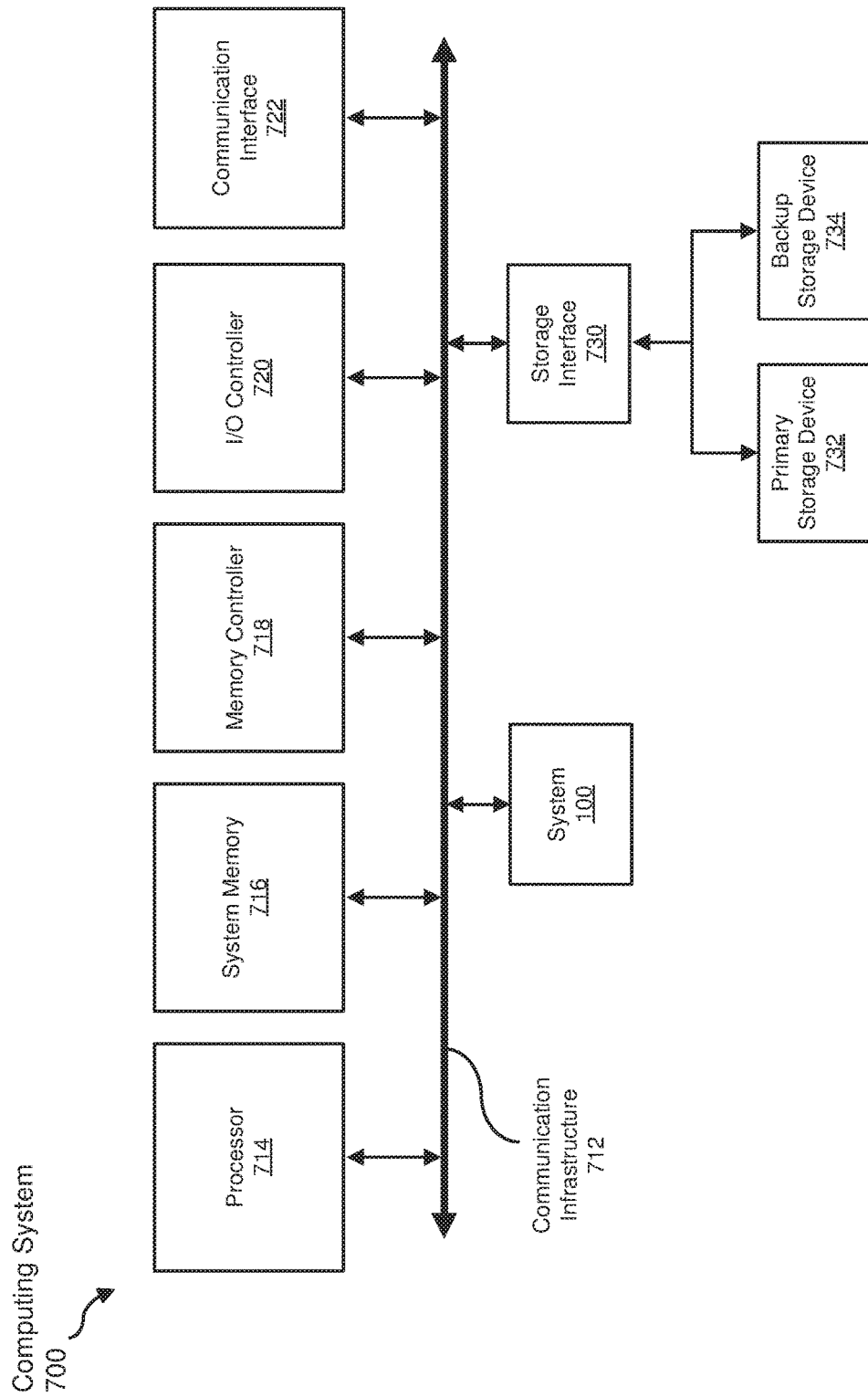
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method for conditional performing media delivery index measurements on streaming media comprising:
   identifying, within a network, a media stream under consideration for a conditional media delivery index;
   identifying, for the media stream, an expected packet rate at which the media stream is expected to pass through at least a portion of the network;
   determining, for the media stream, an actual packet rate at which the media stream actually passes through the portion of the network;
   calculating, based at least in part on the expected packet rate and the actual packet rate, a media rate variation that represents a reference for determining whether to perform the conditional media delivery index on the media stream;
   determining that the media rate variation meets a certain threshold; and
   upon determining that the media rate variation meets the certain threshold, performing the conditional media delivery index on the media stream.

2. The method of claim 1, wherein identifying the expected packet rate for the media stream comprises:
   identifying an expected media rate that accounts for an amount of data that is expected to pass through the portion of the network during a certain interval;
   identifying a number of packets that are carried by a network layer of the network during the certain interval;

identifying a size of the packets carried by the network layer of the network; and calculating the expected packet rate for the media stream by:

multiplying the number of packets by the size of the packets; and dividing the expected media rate by a product of the number of packets and the size of the packets.

3. The method of claim 1, wherein calculating the media rate variation comprises:

subtracting the actual packet rate from the expected packet rate;

dividing a difference of the actual packet rate and the expected packet rate by the expected packet rate; and multiplying a quotient of the difference and the expected packet rate by one hundred.

4. The method of claim 1, further comprising in response to determining that the media rate variation meets the certain threshold, incrementing a counter that tracks a number of continuous intervals during which the certain threshold has been met.

5. The method of claim 4, further comprising determining that the counter meets an additional threshold; and wherein performing the conditional media delivery index on the media stream comprises, in response to determining that the counter meets the additional threshold, activating the conditional media delivery index for the media stream.

6. The method of claim 5, wherein activating the conditional media delivery index for the media stream comprises resetting the counter for a future determination on whether to activate the conditional media delivery index on the media stream.

7. The method of claim 4, further comprising:

determining that the counter does not meet an additional threshold; and in response to determining that the counter does not meet the additional threshold, resetting the counter for a future determination on whether to activate the conditional media delivery index on the media stream.

8. The method of claim 1, further comprising:

determining that the media rate variation no longer meets the certain threshold; and in response to determining that the media rate variation no longer meets the certain threshold, incrementing a counter that tracks a number of continuous intervals during which the certain threshold has not been met.

9. The method of claim 8, further comprising determining that the counter meets an additional threshold; and wherein performing the conditional media delivery index on the media stream comprises, in response to determining that the counter meets the additional threshold, deactivating the conditional media delivery index for the media stream.

10. The method of claim 9, wherein deactivating the conditional media delivery index for the media stream comprises resetting the counter for a future determination on whether to deactivate the conditional media delivery index on the media stream.

11. The method of claim 1, wherein performing the conditional media delivery index on the media stream comprises performing deep packet inspection on the media stream as part of the conditional media delivery index.

12. The method of claim 1, wherein performing the conditional media delivery index on the media stream comprises:

evaluating a quality of the media stream as part of the conditional media delivery index; and performing at least one corrective action on the media stream based at least in part on the quality of the media stream.

13. The method of claim 1, wherein the conditional media delivery index for the media stream comprises:

a delay factor component that involves deep packet inspection; and a media loss rate component that involves deep packet inspection.

14. The method of claim 1, further comprising:

identifying, within the network, an additional media stream under consideration for an additional conditional media delivery index;

identifying, for the additional media stream, an expected packet rate at which the additional media stream is expected to pass through at least a portion of the network;

determining, for the additional media stream, an actual packet rate at which the additional media stream actually passes through the portion of the network;

calculating, based at least in part on the expected packet rate and the actual packet rate, an additional media rate variation that represents a reference for determining whether to perform the additional conditional media delivery index on the media stream;

determining that the additional media rate variation does not meet an additional threshold; and in response to determining that the additional media rate variation does not meet the additional threshold, incrementing a counter that tracks a number of continuous intervals during which the additional threshold has not been met;

determining that the counter does not meet a further threshold; and in response to determining that the counter does not meet the further threshold, resetting the counter for a future determination on whether to deactivate the conditional media delivery index on the media stream.

15. A system comprising:

an identification module, stored in memory, that:

identifies, within a network, a media stream under consideration for a conditional media delivery index; and identifies, for the media stream, an expected packet rate at which the media stream is expected to pass through at least a portion of the network;

a determination module, stored in memory, that determines, for the media stream, an actual packet rate at which the media stream actually passes through the portion of the network;

a calculation module, stored in memory, that calculates, based at least in part on the expected packet rate and the actual packet rate, a media rate variation that represents a reference for determining whether to perform the conditional media delivery index on the media stream; and wherein the determination module further determines that the media rate variation meets a certain threshold;

a media-delivery-index module, stored in memory, performs the conditional media delivery index on the media stream; and at least one physical processor configured to execute the identification module, the determination module, the calculation module, and the media-delivery-index module.

16. The system of claim 15, wherein:

the identification module further:

identifies an expected media rate that accounts for an amount of data that is expected to pass through the portion of the network during a certain interval;

identifies a number of packets that are carried by a network layer of the network during the certain interval;

identifies a size of the packets carried by the network layer of the network; and the calculation module further calculates the expected packet rate for the media stream by:

multiplying the number of packets by the size of the packets; and dividing the expected media rate by a product of the number of packets and the size of the packets.

17. The system of claim 15, wherein the calculation module calculates the media rate variation by:

subtracting the actual packet rate from the expected packet rate;

dividing a difference of the actual packet rate and the expected packet rate by the expected packet rate; and multiplying a quotient of the difference and the expected packet rate by one hundred.

18. The system of claim 15, further comprising a counter module, stored in memory, that increments a counter that tracks a number of continuous intervals during which the certain threshold has been met.

19. The system of claim 18, wherein:

the determination module determines that the counter meets an additional threshold; and the media-delivery-index module activates the conditional media delivery index for the media stream in response to the determination that the counter meets the additional threshold.

20. An apparatus comprising:

a storage device that stores a conditional media delivery index for evaluating the quality of select media streams within a network; and at least one processing device communicatively coupled to the storage device, wherein the processing device:

identifies, within the network, a media stream under consideration for the conditional media delivery index;

identifies, for the media stream, an expected packet rate at which the media stream is expected to pass through at least a portion of the network;

determines, for the media stream, an actual packet rate at which the media stream actually passes through the portion of the network;

calculates, based at least in part on the expected packet rate and the actual packet rate, a media rate variation that represents a reference for determining whether to perform the conditional media delivery index on the media stream;

determines that the media rate variation meets a certain threshold; and performs the conditional media delivery index on the media stream.

* * * * *